April 16, 1963　　F. N. ZIMMERMANN　　3,085,513
PORTABLE IMMERSION ELECTRIC LIQUID PUMP
Filed July 31, 1961
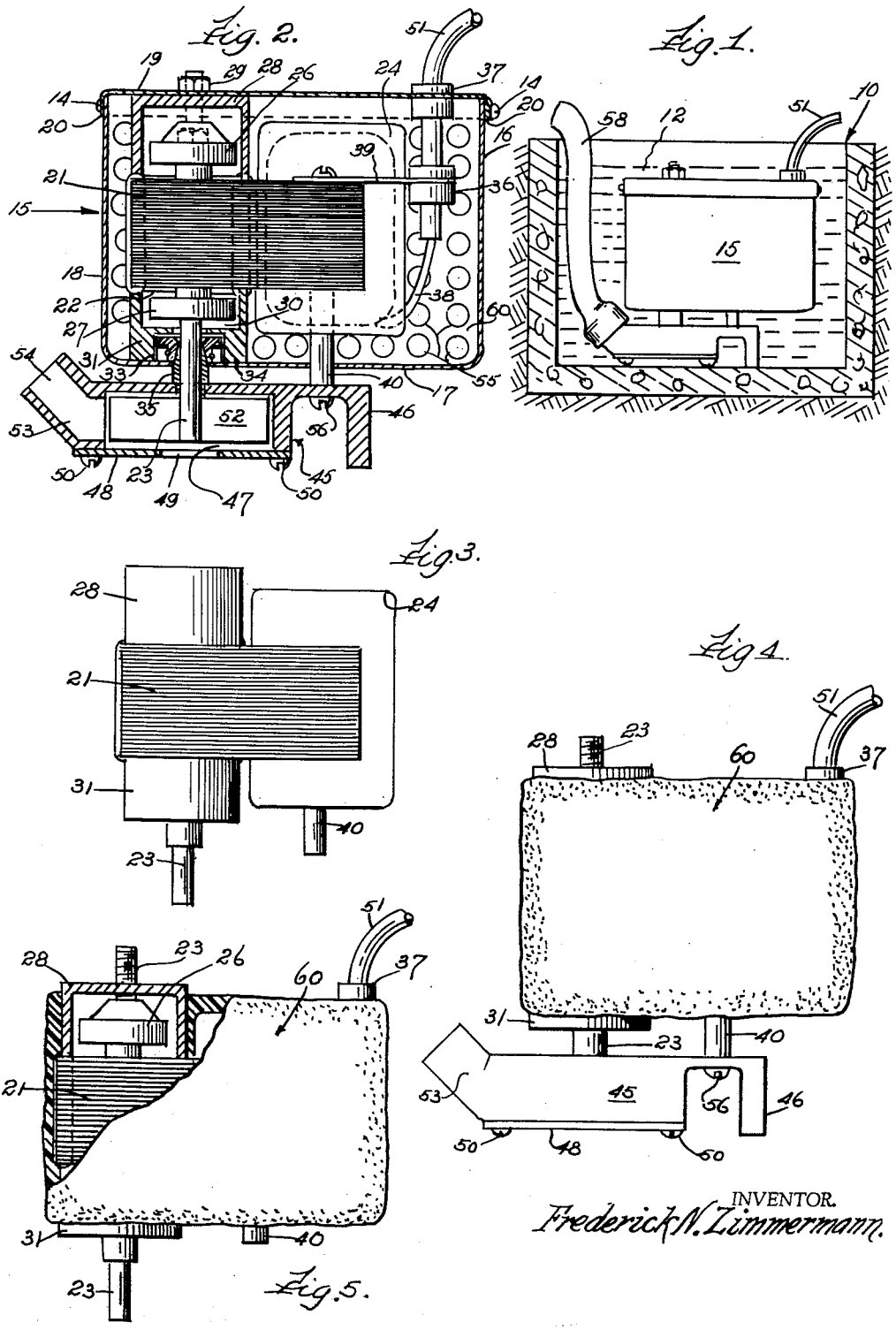
INVENTOR.
Frederick N. Zimmermann.

United States Patent Office
3,085,513
Patented Apr. 16, 1963

1

3,085,513
PORTABLE IMMERSION ELECTRIC LIQUID PUMP
Frederick N. Zimmermann, Bannockburn, Ill., assignor to
March Manufacturing Co., Skokie, Ill., a corporation
of Illinois
Filed July 31, 1961, Ser. No. 128,112
1 Claim. (Cl. 103—87)

This invention relates in general to improvements in pumping units, and more particularly to a novel pump of the submersible type for pumping liquids in which the unit is immersed.

One of the objects of this present invention is to provide a pump of the class described with a pair of efficient seals for preventing the fluid being pumped from seeping into a compartment formed around the motor rotor and motor bearings and enclosing oil therein.

With the pump assemblies of earlier inventions adapted to be submerged in water, the stator and stator coils are generally contained within an oil coolant filled sealed chamber, the oil serving to transmit the heat developed by the pump to the pump shell, the shell being of highly heat conductive material is in direct contact with the liquid in which the unit is immersed and is cooled by the liquid. However, when all of the liquid has been pumped out from around the pump, the shell stays hot, the oil remains hot and soon the pump is damaged due to excessive heat.

Another object of the invention consists of a submersible electric pumping unit in which the motor rotor and motor bearings are contained within an oil coolant filled chamber while the stator coils are enclosed within an outer protective perforated sheet, said stator coils being encapsulated with sealant material which is cast and solidifies at normal room temperature, or other suitable low temperatures, to provide a liquid-proof junction so the entire pumping unit can be immersed directly into a liquid without causing any damage to the unit because of moisture or liquid, when immersed, or from lack of cooling air when removed and operated outside the liquid.

A further object of the invention is to provide a waterproof coating to the stator coils, and the electrical leads to the driving motor, and to portions of the metal seals arranged about the motor bearings of the pump assembly, to provide for heat dissipation from the driving motor and full load operation for long periods of time without injury or substantial loss of efficiency due to deleterious increase in temperature of the driving motor or of the whole assembly, the coating providing means whereby the motor is completely sealed against moisture and the like, and also having its heat radiating area increased by said coating the said coating having good thermal conductivity.

A still further object of the invention is to provide for the rapid and secure assembly of the motor and pump parts and rapid and efficient closing and sealing of the parts from which liquid to be pumped is to be excluded.

Another object of the invention is to provide a method of making and assembling a pump for carrying out some or all of the preceding objects; and more particularly to provide a method of centering, locating and aligning the motor and impeller parts of a pump with respect to co-acting parts and instrumentalities and the method of encapsulating the stator coils with epoxy resin, whereby it is completely sealed against liquid, moisture and the like.

Other objects include providing method and means for making an efficient, compact, longlived, rugged water pump economically and effectively.

Other objects and a fuller understanding of the invention may be had by referring to the following description taken in conjunction with the accompanying drawings, in which:

2

FIGURE 1 is a fragmentary view in elevation illustrating the pumping unit of the invention in operative relation to a reservoir or other container from which liquid is to be pumped and in which the unit is immersed;

FIGURE 2 is an enlarged vertical central sectional view showing a preferred embodiment of the invention;

FIGURE 3 is a fragmentary view in elevation illustrating the motor and its stator coils assembled together and removed from its perforated shell;

FIGURE 4 is a fragmentary view in elevation of the electric motor and pump assembly, the stator coils and portions of the bearing caps and lead end wire encapsulated with suitable sealant material; and FIGURE 5 is a fragmentary view in elevation, similar to FIGURE 3, with a portion partially in section.

Referring now to the drawings of the pump assembly made in accordance with my invention, the reference numeral 10 designates a suitable conventionally illustrated reservoir, fountain or the like, in which a quantity of liquid 12 is contained, said liquid to be pumped by the pumping unit which is generally indicated by the reference numeral 15.

Referring to FIGURE 2, wherein details of the construction are illustrated, the pump unit 15 consisting of a pump protective shell 16 constructed from suitable, perforated sheet metal embodying a base portion 17 with suitable side and end walls 18, the upper portion of said shell 16 being covered by a substantially rectangular shaped cover 19 with depending walls 20, the said cover being slightly larger than the rectangular upper portion of said shell so that the depending walls 20 extend outside from the vertical walls of the shell and secured therewith by bolts 14.

Referring to FIGURES 2 and 3, there is shown a motor 21 having a rotor 22 rotatable on a vertical axis and driving a shaft 23. It will be noted that the motor 21 has the coil 24 mounted upon the field of magnetic material and to one side of the rotor 22. The motor 21 is provided with an upper bearing cap 26 and a lower bearing cap 27 mounted upon the shaft 23. A hollow motor upper end cap, or upper bearing cap shield 28 with its lower end open and a hole in its closed end is placed over the upper end of shaft 23 covering and sealing the bearing cap 26 therewithin when the bearing cap shield is secured against the upper surface of the field of the motor by nut 29. A hollow motor lower end cap, or lower bearing cap shield 31 similar to the shield 28 is placed over the lower end of shaft 23, thereby sealing bearing cap 27 therewithin.

The substantially closed bottom wall of said cap, or shield 31 is provided with a counter bore forming a grommet cavity 33 to retain a grommet 34, or shaft seal therein, the grommet 34 having a cone-shaped lower bore to receive the hollow metal spacer 35 mounted upon the shaft 23 and having a cone-shaped upper end portion. The space surrounding the shaft 23 and the rotor 22, and between the upper and lower motor end caps 28 and 31 and inside motor wall, will be considered the motor chamber 30. This motor chamber 30 is filled with oil coolant by inverting the motor assembly and removing the grommet, pouring oil into the counterbore, or grommet cavity 33 and allowing it to run down around shaft 23 filling the chamber, replacing the grommet to seal the oil therein. The motor 21 has a strain relief support bracket 39 secured thereto by a stud 40, as clearly shown by FIG. 2, said support formed to hold a strain relief support bushing 36. The cover 19 is provided with an opening in vertical alignment and above the opening in the support bracket 35, whereby a strain relief bushing 37 is supported therein. A waterproof electric cord 51 extends through the bushings 36 and 37 providing cable 38 which supplies the electric current to the terminal conductor on electric motor 21, shown by FIG. 2. The lower end of shaft 23 with metal spacer 35, and the lower end of stud 40, project downwardly from the motor 21 and extend through the base portion 17 of shell 16. The cover 19 is bolted to the shell 16, making a rigid assembly as the nut 29 is threaded upon the upper end of shaft 23 and clamps the cover 19 against the top of motor end cap 28.

A pump housing 44 is constructed from a suitable casting, embodying a base portion 45, suitable side walls and a forward end wall 46. Said pump housing having a circular pump chamber 47 open at the bottom thereof. Said pump chamber 47 is closed by a bottom plate 48 to form the impeller cavity. Said plate 48 is provided with a central opening 49 for the entry of liquid 12 into the impeller cavity 47, sometimes referred to as pump chamber 47. The forward end wall 46 and the heads of the screws 50 used to secure said bottom plate 48 in place, provide sufficient clearance by elevating the bottom plate 48 a desired distance above the bottom of the reservoir 10. The shaft 23 becomes the driving shaft for the impeller 52 secured to the lower end thereof and within said impeller cavity 47. In the rear wall of the base portion 45 is provided an enlarged boss member 53, said member being bored out to form an interior opening leading to the impeller cavity 47, and forming an exterior opening 54 adapted to receive a suitable hose, iron pipe, or copper tubing 58 to carry away the liquid 12 being pumped. The protective shell 16 is provided with openings 55 through which the liquid 12 may travel when the pump is submerged in the liquid, or through which air can travel when the pump is only partially submerged, forming a cooling medium for the shell 16. It is clearly seen that the pump housing 44 is secured to the lower end of stud 40 by screw 50 and aligned longitudinally by spacer 35 on shaft 23. It is also clearly seen that the pump rotor and the bearings are enclosed in an oil coolant in the motor chamber 30, the motor field being enclosed by the perforated shell and covered by the liquid 12 when the pump is submerged in liquid; this area can be referred to as the motor field chamber 60.

As shown by FIGURE 3, the motor 21 with a field of magnetic material and a coil 24 and motor end caps 28 and 31 are assembled together as a motor unit. The motor unit is then substantially covered by a silicone rubber sealant or molding plastic material 62 such as epoxy resin without pressure being required during the curing process. After a period of time, at room temperature, or relatively low temperature much below 350°, the resin becomes completely hardened and encapsulates the entire electric motor, substantially all of the motor and caps, the strain relief bracket and the bushing secured thereto, as shown by FIG. 4. The coated motor with the pump housing 44 can be assembled with or without the protective shell 16, shown by FIG. 4. The thickness of the epoxy resin coating is shown by FIG. 5. The silicone rubber sealant, epoxy resin, or the equivalent, permits the coated motor unit to be assembled within the protective shell 16 and the second strain relief bushing associated with the cover 19. The coating covers the non-insulated parts preventing moisture and liquid from contacting vital metal, movable parts. As an example, epoxy resin involves the mixing of two components, a resin and a hardener; no chemical action takes place until the two are mixed. Once the two components are mixed, the mixture is poured into a holder, or container, and the motor unit is coated by dipping it into the mixture, or the mixture is sprayed or poured thereon and the casting type coating hardens without the addition of heat, or by low temperature heat only. The sealant forms a watertight bond with the exterior of the motor and the lead wire associated therewith.

The necessity of such a totally-insulated motor unit for use in liquids or where used in moist atmospheres, is well known. Because it was difficult to provide a completely waterproof electric pump, many previous pumps were forced to be completely enclosed in oil, the oil absorbing the heat from the pump and motor parts, the outer shell being of highly heat conductive material conveyed the heat to the water in which it is submerged. However, when the water level becomes low, or the reservoir becomes dry of water to be pumped, the shell stays hot and cannot cool the oil; whereby, the running or moving parts become over-heated, the gaskets become damaged by the heat and then when water, or a liquid, again returns to the reservoir to be pumped, the water leaks into the bearings or becomes mixed with the oil, providing poor lubrication, resulting in complete ruination of the pump. My coated unit provides a completely sealed motor chamber with oil therein, the heat of the moving parts is conducted by the oil to the associated metal wall and parts, through the resin coating and to the liquid in which the pump is immersed. Should the water become pumped out, the air conducts the heat from the coated unit, and when water again returns to the reservoir, the coating will not allow any water to leak into the motor chamber past the gaskets and grommets about moving parts. It is well known that moving parts when free of rust, or dirt, there is less friction and less heat produced. Therefore, if no moisture can come in contact with heated or worn grommets, due to a complete coating of the parts by a breathing type resin, my pump will run and excessive heat of the motor unit never is encountered.

In my invention, a portable immersion type electric pump is obtained and is free of elevated temperatures which affects parts, resulting in a damaged, worn-out pump unit. The epoxy resin, or other suitable materials such as Silicon rubber sealant, is cast about the motor parts and no pressure is required during the curing process, the resin becomes completely hardened and encapsulates the electrically energized, non-insulated parts, in a waterproof layer of resin of good thermo-conductivity to totally cover the motor unit. This process lends itself to a low-cost, easily adaptable method of making a waterproof motor unit suitable for use and assembly to form an electrically driven pump suitable to be immersed in the liquid being pumped.

Although I have described by invention with a certain degree of particularity, it is understood that the present disclosure has been made by way of example, and that changes in detail of construction and the combination and arrangement of parts may be resorted to without departing from the spirit and scope of the invention here presented.

I claim:

An electric actuated liquid pump assembly comprising an electric motor unit and a liquid pump housing rigidly secured together, said motor unit having a drive shaft, a rotor, a field of magnetic material, a coil mounted on said field, said rotor mounted on said drive shaft and rotatable therewith, an upper bearing cap mounted upon said field and supporting the upper end portion of said drive shaft, a lower bearing cap mounted upon the lower surface of said field and supporting the lower end portion of said drive shaft, an upper bearing cap shield enclosing said upper bearing cap and secured in intimate contact with the upper surface of said field, a lower bearing cap shield enclosing said lower bearing cap and secured in intimate contact with the lower surface of said field, a pump housing, a depending support stud extending from the motor, said pump housing attached solely to the lower end of said support stud, said pump housing having a circular impeller cavity, a centrally located bore in the upper wall of said pump housing above said impeller cavity, a hollow metal spacer mounted upon said drive shaft between said lower bearing cap shield and the upper surface of said pump housing to space said housing from said lower bearing cap shield, the lower end of said drive shaft extending into said impeller cavity and arranged to rotate therein, an impeller affixed to the lower end of said drive shaft within said impeller cavity and arranged to rotate with said drive shaft, said impeller cavity having a liquid inlet and a liquid outlet embodied therewith, and a layer of epoxy resin encapsulating said motor thereby coating the external surfaces of said field, said coil, and said bearing cap shields whereby said rotor and bearing caps remain in an uncoated condition and the said epoxy resin acts as a heat transfer medium for heat generated by said electric motor unit.

References Cited in the file of this patent

UNITED STATES PATENTS

| | | |
|---|---|---|
| 2,971,467 | Konopka et al. | Feb. 14, 1961 |
| 2,974,059 | Gemmer | Mar. 7, 1961 |
| 2,978,659 | Wahlgren | Apr. 4, 1961 |
| 2,981,196 | Zimmermann | Apr. 25, 1961 |
| 2,997,776 | Matter et al. | Aug. 29, 1961 |
| 3,028,251 | Nagel | Apr. 3, 1962 |

OTHER REFERENCES

Publication: Ciba Company, Inc., Plastics Div., Technical Data Bulletin No. 8, S.N. 462,091.